(12) United States Patent
Chang et al.

(10) Patent No.: US 11,461,693 B2
(45) Date of Patent: Oct. 4, 2022

(54) TRAINING APPARATUS AND TRAINING METHOD FOR PROVIDING SAMPLE SIZE EXPANDING MODEL

(71) Applicant: United Microelectronics Corp., Hsinchu (TW)

(72) Inventors: Yao-Sheng Chang, Changhua County (TW); Ya-Ching Cheng, Hsinchu (TW); Chien-Hung Chen, Hsinchu County (TW); Chih-Yueh Li, Taipei (TW); Da-Ching Liao, Taichung (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 1081 days.

(21) Appl. No.: 16/105,182

(22) Filed: Aug. 20, 2018

(65) Prior Publication Data

US 2020/0057966 A1   Feb. 20, 2020

(51) Int. Cl.
*G06N 20/00* (2019.01)
*G06F 17/16* (2006.01)
*G06F 5/01* (2006.01)

(52) U.S. Cl.
CPC ........... *G06N 20/00* (2019.01); *G06F 5/01* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 5,255,347 A | 10/1993 | Matsuba et al. | |
| 9,904,893 B2 | 2/2018 | Veeramachaneni et al. | |
| 10,916,333 B1* | 2/2021 | Yeturu | G06N 5/003 |
| 2003/0191728 A1 | 10/2003 | Kulkarni et al. | |
| 2015/0134578 A1* | 5/2015 | Tamatsu | G06N 3/084 |
| | | | 706/12 |
| 2017/0161635 A1 | 6/2017 | Oono et al. | |
| 2017/0230675 A1* | 8/2017 | Wierstra | G06N 3/0445 |
| 2018/0025257 A1* | 1/2018 | van den Oord | G06K 9/623 |
| | | | 375/240.14 |
| 2018/0144246 A1* | 5/2018 | Jayadeva | G06N 3/0454 |
| 2019/0228312 A1* | 7/2019 | Andoni | G06N 3/0454 |
| 2019/0347526 A1* | 11/2019 | Sunkavalli | G06N 3/084 |
| 2020/0242466 A1* | 7/2020 | Mohassel | G06N 3/084 |

FOREIGN PATENT DOCUMENTS

| | | | | |
|---|---|---|---|---|
| CN | 201810307364 | * | 4/2018 | ............... G06N 3/08 |
| DE | 102017219492 | * | 11/2017 | ............... G06N 7/00 |

* cited by examiner

*Primary Examiner* — David J Stoltenberg
(74) *Attorney, Agent, or Firm* — WPAT, PC

(57) ABSTRACT

A training apparatus and a training method for providing a sample size expanding model are provided. A normalizing unit receives a training data set with at least one numeric predictor factor and a numeric response factor. An encoding unit trains the training data set in an initial encoding layer and at least one deep encoding layer. A modeling unit extracts a mean vector and a variance vector and inputting the mean vector and the variance vector together into a latent hidden layer for obtaining the sample size expanding model. A decoding unit trains the training data set in at least one deep decoding layer and a last encoding layer. A verifying unit performs a verification of the sample size expanding model according to the outputting data set. A data generating unit generates a plurality of samples via the sample size expanding model.

20 Claims, 3 Drawing Sheets

US 11,461,693 B2

TRAINING APPARATUS AND TRAINING METHOD FOR PROVIDING SAMPLE SIZE EXPANDING MODEL

TECHNICAL FIELD

The disclosure relates in general to a training apparatus and a training method, and more particularly to a training apparatus and a training method for providing a sample size expanding model.

BACKGROUND

In the research and development (RD) stage of the semiconductor industry, it often suffers a small sample data issue with huge size of parameters. It is needed to develop a data generation method in order to generate big data from small sample data set.

In the past, text data can be generated by Prior Bayesian and variational technique. However, the Prior Bayesian and variational technique only generate text data and common data set without cause-effect relation. Moreover, training small sample may cause a serious gradient vanishing issue, and the user should carefully use the transfer function.

SUMMARY

The disclosure is directed to a training apparatus and a training method for providing a sample size expanding model. A training data set includes a numeric response factor, so the sample size expanding model can be used to generate big data with cause-effect relation. The big data with cause-effect relation is useful in the semiconductor technology. Moreover, the training apparatus and the training method use a nonlinear function as a transfer function and perform a verification to prevent from the gradient vanishing issue.

According to one embodiment, a training apparatus for providing a sample size expanding model is provided. The training apparatus includes a normalizing unit, an encoding unit, a modeling unit, a decoding unit, a recovering unit, a verifying unit and a data generating unit. The normalizing unit is used for receiving a training data set with at least one numeric predictor factor and a numeric response factor and rescaling a scale of the training data set into a predetermined interval. The encoding unit is used for training the training data set in an initial encoding layer and at least one deep encoding layer. The modeling unit is used for extracting a mean vector and a variance vector and inputting the mean vector and the variance vector together into a latent hidden layer for obtaining the sample size expanding model. The decoding unit is used for training the training data set in at least one deep decoding layer and a last encoding layer. The recovering unit is used for recovering the scale of the training data set to obtain an outputting data set. The verifying unit is used for performing a verification of the sample size expanding model according to the outputting data set. The data generating unit is used for generating a plurality of samples via the sample size expanding model, if the verification is passed.

According to another embodiment, a training method for providing a sample size expanding model is provided. The training method includes the following steps: A training data set with at least one numeric predictor factor and a numeric response factor is received and a scale of the training data set is rescaled into a predetermined interval. The training data set is trained in an initial encoding layer and at least one deep encoding layer. A mean vector and a variance vector are extracted and the mean vector and the variance vector are inputted together into a latent hidden layer for obtaining the sample size expanding model. The training data set is trained in at least one deep decoding layer and a last encoding layer. The scale of the training data set is recovered to obtain an outputting data set. A verification of the sample size expanding model is performed according to the outputting data set. A plurality of samples are generated via the sample size expanding model, if the verification is passed.

Figure 1:
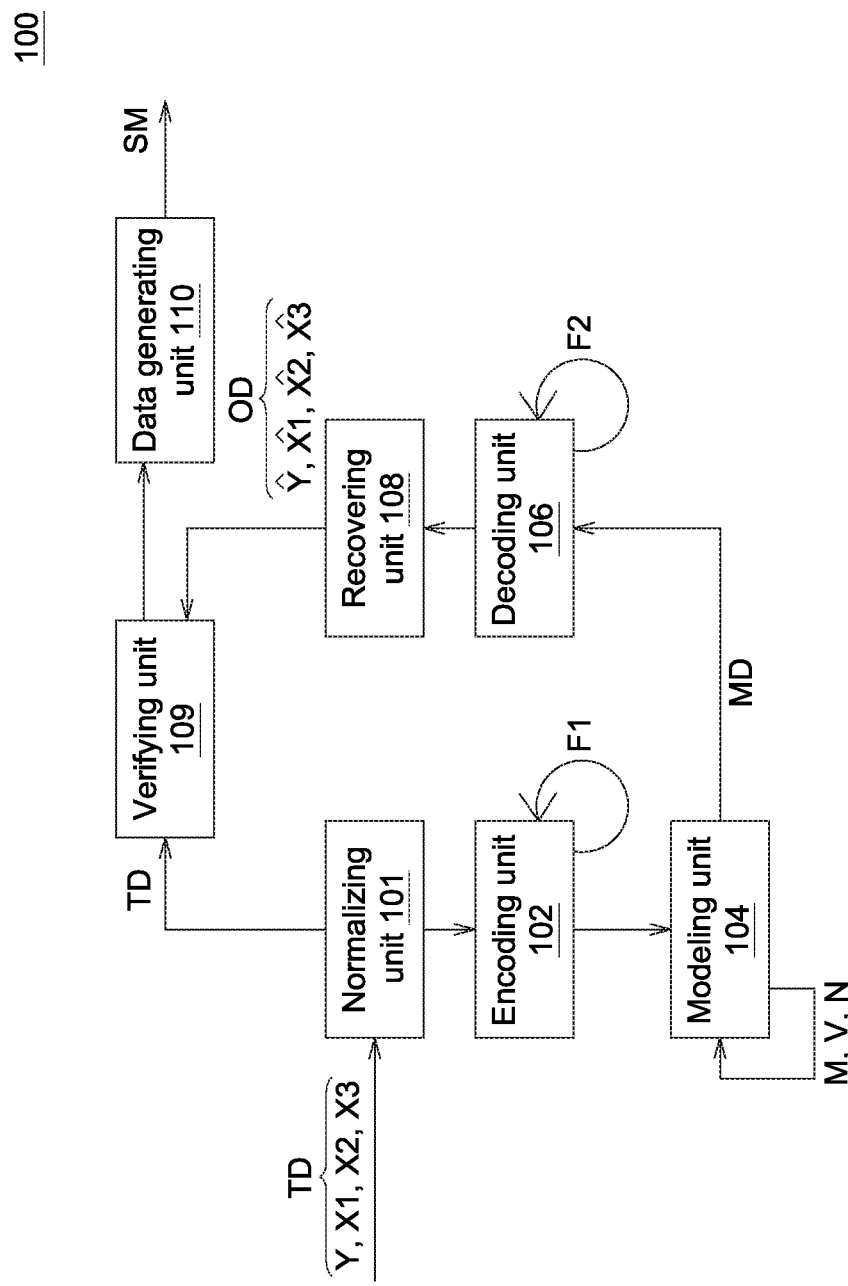
FIG. 1 which shows a training apparatus for providing the sample size expanding model according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In order to generate big data from small sample data set, a training apparatus 100 (shown in FIG. 1) and a training method for providing a sample size expanding model MD (shown in FIGS. 1 and 3) are provided. The sample size expanding model MD can be used to generate big data with cause-effect relation. The big data with cause-effect relation is useful in the semiconductor technology. Moreover, the training apparatus 100 and the training method use a nonlinear function as a transfer function and perform a verification to prevent from the gradient vanishing issue.

Please refer to FIG. 1 which shows the training apparatus 100 for providing the sample size expanding model MD according to one embodiment. The training apparatus 100 may be a computer, a computing cloud, a server, a chip, a circuit or a circuit board. The training apparatus 100 includes a normalizing unit 101, an encoding unit 102, a modeling unit 104, a decoding unit 106, a recovering unit 108, a verifying unit 109 and a data generating unit 110. The normalizing unit 101, the encoding unit 102, the modeling unit 104, the decoding unit 106, the recovering unit 108, the verifying unit 109 and the data generating unit 110 may be a chip, a circuit, a circuit board, a storage device storing a plurality of program codes. The operation of those elements is illustrated with a flowchart.

Figure 2:
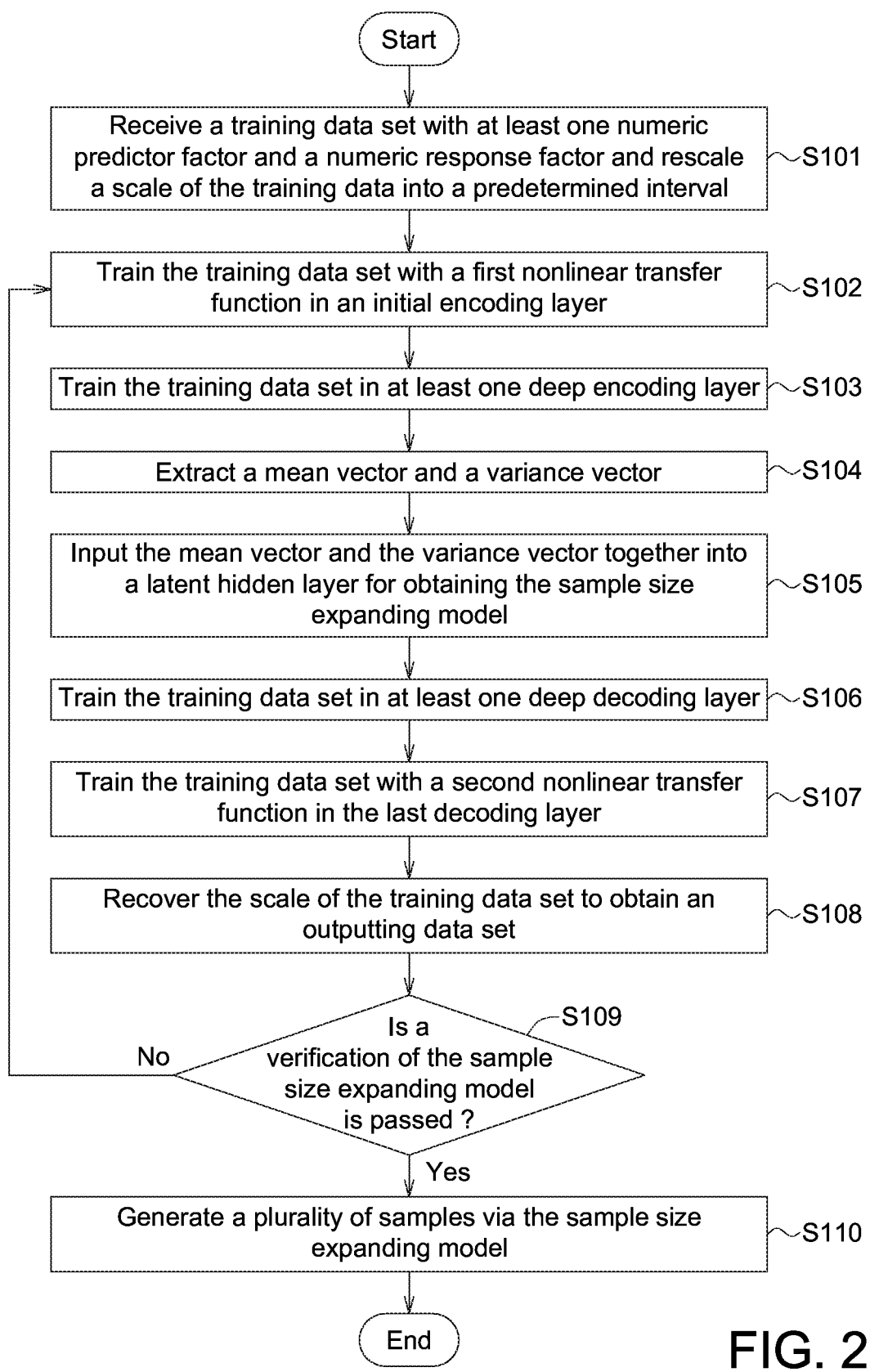
FIG. 2 shows a flowchart of the training method for providing the sample size expanding model according to one embodiment.
Figure 3:
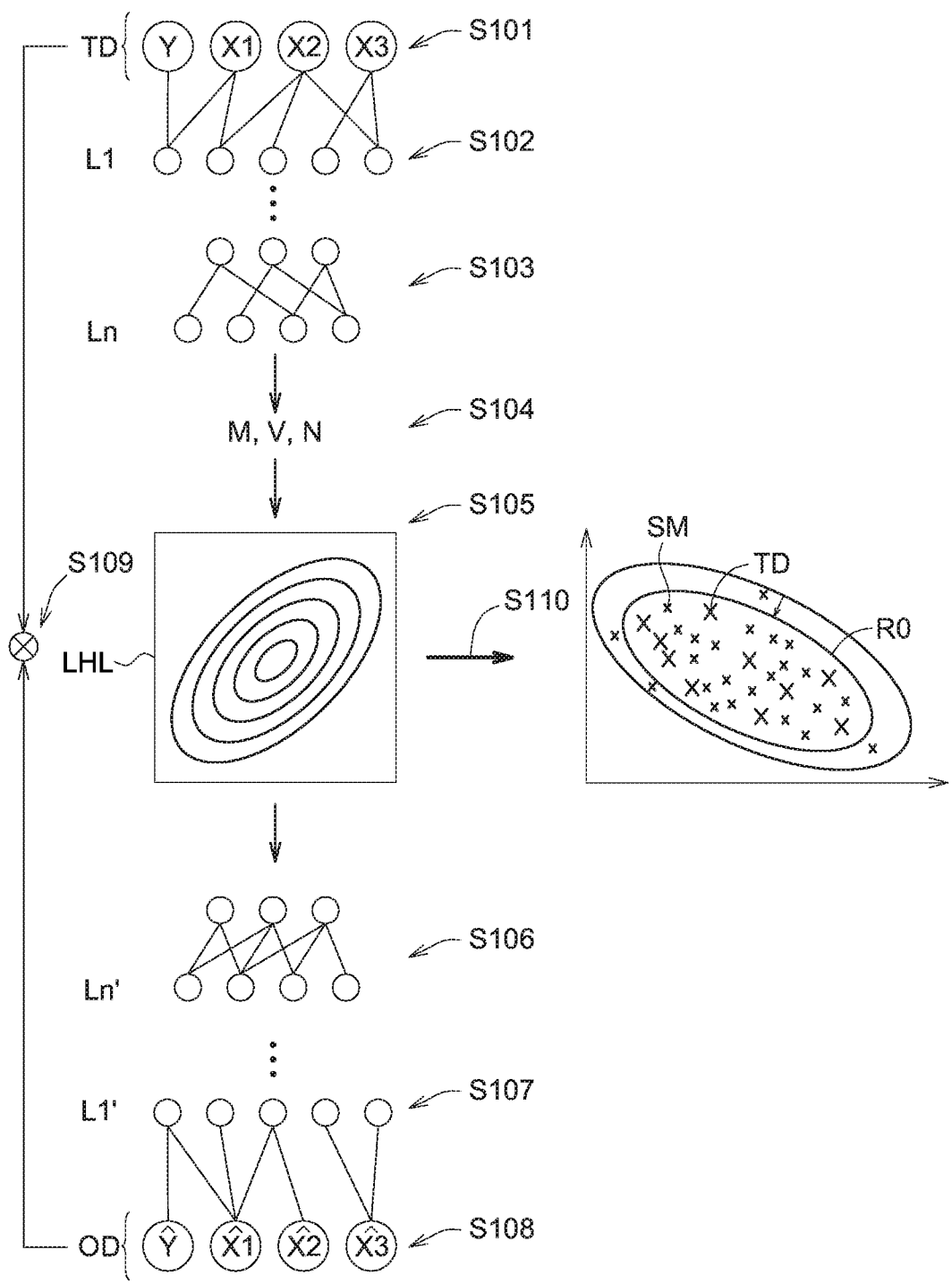
FIG. 3 illustrates the steps in FIG. 2.

Please refer to FIG. 2 and FIG. 3. FIG. 2 shows a flowchart of the training method for providing the sample size expanding model MD according to one embodiment. FIG. 3 illustrates the steps in FIG. 2. In step S101, the normalizing unit 101 receives a training data set TD with at least one numeric predictor factor(s) X1, X2, X3 and a numeric response factor Y and rescales a scale of the training data set TD into a predetermined interval. In this step, the training data set TD may a numeric data set obtained from the manufacturing process. The numeric predictor factors X1, X2, X3 may be the controlling parameters of the manufacturing apparatus, the amount of inputting gas or the concentration of the medicinal liquid. The numeric response factor Y may be the result of the manufacturing process. For example, the numeric response factor Y may be the thickness of the thin film, the resistance of the metal line, the number of the particles on the wafer.

The scales of the numeric predictor factors X1, X2, X3 and the numeric response factor Y may be different. In this step, the normalizing unit 101 rescales the scale of the numeric predictor factors X1, X2, X3 and the numeric response factor Y into the predetermined interval, such as an interval from 0 to 1. After normalizing, the training data set TD will be easier to be converged during the training process. For example, the training data set TD can be rescaled into the interval from 0 to 1 via the following equation (1). "A" is one original value, "Min" is the minimum value among all of the original values, "Max" is the maximum value among all of the original values, "A*" is the rescaled value.

$$A^* = \frac{A - \text{Min}}{\text{Max} - \text{Min}} \tag{1}$$

Next, in the step S102, the encoding unit 102 trains the training data set TD with a first nonlinear transfer function F1 in an initial encoding layer L1. The first nonlinear transfer function F1 is designed according to the characteristic of the manufacturing process. For example, the first nonlinear transfer function F1 may be a softmax function, an elu function, a softplus function, a softsign function, a tan h function, a sigmoid function, or a hard_sigmoid function.

Then, in the step S103, the encoding unit 102 trains the training data set TD in at least one deep encoding layer Ln. In this step, the transfer function used may be linear or nonlinear. For example, in this step, the training data set TD may be trained with a relu function or a Sigmoid function. The transfer function used in the step S103 may be different from the first nonlinear transfer function F1 used in the step S102. Moreover, the transfer functions used in several deep encoding layers Ln in the step S102 may be different.

Afterwards, in step S104, the modeling unit 104 extracts a mean vector M and a variance vector V. In this step, the modeling unit 104 extracts the mean vector M and the variance vector V with Gaussian noise N. The mean vector M and the variance vector V and Gaussian noise N are used for creating a Gaussian space.

Then, in step S105, the modeling unit 104 inputs the mean vector M and the variance vector V together into a latent hidden layer LHL for obtaining the sample size expanding model MD. After finishing the step S105, the sample size expanding model MD is created. The following steps S106 to S109 are used to ensure that this sample size expanding model MD is useful for this particular manufacturing process.

In step S106, the decoding unit 106 trains the training data set TD in at least one deep decoding layer Ln'. The at least one deep decoding layer Ln' is symmetrical to the at least one deep encoding layer Ln. For example, the number of the neurons of any of the deep encoding layer Ln is identical to that of the corresponding one of deep decoding layer Ln'. Moreover, the transfer function used in of any of the deep encoding layer Ln is identical to that of the corresponding one of deep decoding layer Ln'.

In step S107, the decoding unit 106 trains the training data set TD with a second nonlinear transfer function F2 in the last decoding layer L1'. In this embodiment, the first nonlinear transfer function F1 and the second nonlinear transfer function F2 are the same.

That is to say, the steps S106 and S107 are the reverse procedure of the steps S102 and S103. The procedure of the steps S106 and S107 is symmetrical to the procedure of the steps S102 and S103.

Next, in step S108, the recovering unit 108 recovers the scale of the training data set TD to obtain an outputting data set OD with at least one numeric predictor factor(s) $\widehat{X1}$, $\widehat{X2}$, $\widehat{X3}$ and a numeric response factor $\hat{Y}$. For example, the training data set TD can be rescaled via the following equation (2). $\widehat{A}$ is the trained value, $\hat{A}$ is the recovered value.

$$\hat{A} = \widehat{A} * (\text{Max} - \text{Min}) + \text{Min} \tag{2}$$

Afterwards, in the step S109, the verifying unit 109 performs a verification of the sample size expanding model MD according to the outputting data set OD. In this step, the verification is performed according to a correlation information, a distance information or a distribution similarity information of the outputting data set. For example, the correlation information is a Correlation coefficient, such as R-square; the distance information is an Euclidean distance, a Manhattan distance or a Chebyshev distance; and the distribution similarity information is a k_divergence. The verification is used to check whether the outputting data set OD is similar to the training data set TD. If the outputting data set OD is similar to the training data set TD, then the representative of the big data generated from the sample size expanding model MD can be ensured.

If the verification is passed, the process proceeds to step S110. In step S110, the data generating unit 110 generates a plurality of samples SM via the sample size expanding model MD. Please referring to the right chart of FIG. 3, the big "X" points are the training data set TD and the small "x" points are the samples SM generated from the sample size expanding model MD.

In the step S110, the samples SM can be generated from a preset range in a Gaussian space of the sample size expanding model MD. For example, the preset range may be a range RO from −4 to 4. As shown in the right chart of FIG. 3, the samples SM located within the range RO are outputted.

Please refer to Table I, which shows an example of the steps S101 to S108. In this example, the training method is performed without the steps S103 and the step S106 and number of neurons is symmetrical.

TABLE I

|  | Transfer function | Number of neurons |
|---|---|---|
| Training data set TD |  | 4 |
| Initial encoding layer L1 | First nonlinear transfer function F1 | 2 |
| Latent hidden layer LHL | Sigmoid function | 2 |
| Last decoding layer L1' | Second nonlinear transfer function F2 | 2 |
| Outputting data set OD |  | 4 |

Please refer to Table II, which shows another example of the steps S101 to S108. In this example, number of neurons is monotonic decreased during the steps S101 to S103.

TABLE II

|  | Transfer function | Number of neurons |
|---|---|---|
| Training data set TD |  | 4 |
| Initial encoding layer L1 | First nonlinear transfer function F1 | 3 |
| Deep encoding layer Ln | Relu function | 2 |
| Latent hidden layer LHL | Sigmoid function | 2 |
| Deep decoding layer Ln' | Relu function | 2 |
| Last decoding layer L1' | Second nonlinear transfer function F2 | 3 |
| Outputting data set OD |  | 4 |

Please refer to Table II, which shows another example of the steps S101 to S108. In this example, number of neurons is contracted after expansion during the steps S101 to S103.

TABLE III

|  | Transfer function | Number of neurons |
|---|---|---|
| Training data set TD |  | 40 |
| Initial encoding layer L1 | First nonlinear transfer function F1 | 20 |
| Deep encoding layer Ln | Relu function | 10 |
| Deep encoding layer Ln | Relu function | 8 |
| Deep encoding layer Ln | Relu function | 6 |
| Deep encoding layer Ln | Relu function | 4 |
| Deep encoding layer Ln | Relu function | 2 |
| Latent hidden layer LHL | Sigmoid function | 2 |
| Deep decoding layer Ln' | Relu function | 2 |
| Deep decoding layer Ln' | Relu function | 4 |
| Deep decoding layer Ln' | Relu function | 6 |
| Deep decoding layer Ln' | Relu function | 8 |
| Deep decoding layer Ln' | Relu function | 10 |
| Deep decoding layer Ln' | Relu function | 20 |
| Last decoding layer L1' | Second nonlinear transfer function F2 | 40 |
| Outputting data set OD |  | 4 |

According to the embodiments described above, the training data set TD includes the numeric response factor Y, so the sample size expanding model MD can be used to generate big data with cause-effect relation. Moreover, the training apparatus 100 and the training method use a nonlinear function as a transfer function and perform a verification to prevent from the gradient vanishing issue.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A training apparatus for providing a sample size expanding model, comprising:
   a normalizing unit for receiving a training data set with at least one numeric predictor factor and a numeric response factor and rescaling a scale of the training data set into a predetermined interval;
   an encoding unit for training the training data set in an initial encoding layer and at least one deep encoding layer;
   a modeling unit for extracting a mean vector and a variance vector and inputting the mean vector and the variance vector together into a latent hidden layer for obtaining the sample size expanding model;
   a decoding unit for training the training data set in at least one deep decoding layer and a last encoding layer;
   a recovering unit for recovering the scale of the training data set to obtain an outputting data set;
   a verifying unit for performing a verification of the sample size expanding model according to the outputting data set; and
   a data generating unit for generating a plurality of samples via the sample size expanding model, if the verification is passed.

2. The training apparatus for providing the sample size expanding model according to claim 1, wherein the predetermined interval is an interval from 0 to 1.

3. The training apparatus for providing the sample size expanding model according to claim 1, wherein the encoding unit trains the training data set with a first nonlinear transfer function in an initial encoding layer and then trains the training data set in the at least one deep encoding layer.

4. The training apparatus for providing the sample size expanding model according to claim 1, wherein the modeling unit extracts the mean vector and the variance vector with Gaussian noise.

5. The training apparatus for providing the sample size expanding model according to claim 1, wherein the decoding unit trains the training data set in the deep decoding layer and then trains the training data set with a second nonlinear transfer function in the last decoding layer.

6. The training apparatus for providing the sample size expanding model according to claim 1, wherein the encoding unit trains the training data set with a first nonlinear transfer function in the initial decoding layer, the decoding unit trains the training data set with a second nonlinear transfer function in the last decoding layer, and the first nonlinear transfer function and the second nonlinear transfer function are the same.

7. The training apparatus for providing the sample size expanding model according to claim 1, wherein the verifying unit performs the verification according to a correlation information, a distance information or a distribution similarity information of the outputting data set.

8. The training apparatus for providing the sample size expanding model according to claim 7, wherein the correlation information is a Correlation coefficient; the distance information is an Euclidean distance, a Manhattan distance or a Chebyshev distance; and the distribution similarity information is a k_divergence.

9. The training apparatus for providing the sample size expanding model according to claim 1, wherein the data generating unit generates the samples from a preset range in a Gaussian space of the sample size expanding model.

10. The training apparatus for providing the sample size expanding model according to claim 9, wherein the preset range is from −4 to 4.

11. A training method for providing a sample size expanding model wherein the training method is executed by a computer and the training method comprises:
   receiving a training data set with at least one numeric predictor factor and a numeric response factor and rescaling a scale of the training data set into a predetermined interval;
   training the training data set in an initial encoding layer and at least one deep encoding layer;
   extracting a mean vector and a variance vector and inputting the mean vector and the variance vector together into a latent hidden layer for obtaining the sample size expanding model;
   training the training data set in at least one deep decoding layer and a last encoding layer;

recovering the scale of the training data set to obtain an outputting data set;
performing a verification of the sample size expanding model according to the outputting data set; and
generating a plurality of samples via the sample size expanding model, if the verification is passed.

12. The training method for providing the sample size expanding model according to claim 11, wherein in the step of providing the training data set and rescaling the scale of the training data set, the predetermined interval is an interval from 0 to 1.

13. The training method for providing the sample size expanding model according to claim 11, wherein the step of training the training data set in the initial encoding layer and the deep encoding layer includes:
training the training data set with a first nonlinear transfer function in an initial encoding layer; and
training the training data set in the at least one deep encoding layer.

14. The training method for providing the sample size expanding model according to claim 11, wherein in the step of extracting the mean vector and the variance vector, the mean vector and the variance vector are extracted with Gaussian noise.

15. The training method for providing the sample size expanding model according to claim 11, wherein the step of training the training data set in the decoding layer and obtaining the outputting data set includes:
training the training data set in the deep decoding layer; and
training the training data set with a second nonlinear transfer function in the last decoding layer.

16. The training method for providing the sample size expanding model according to claim 11, wherein the training data set is trained with a first nonlinear transfer function in the initial decoding layer, the training data set is trained with a second nonlinear transfer function in the last decoding layer, and the first nonlinear transfer function and the second nonlinear transfer function are the same.

17. The training method for providing the sample size expanding model according to claim 11, wherein in the step of performing the verification of the sample size expanding model, the verification is performed according to a correlation information, a distance information or a distribution similarity information of the outputting data set.

18. The training method for providing the sample size expanding model according to claim 17, wherein in the step of performing the verification of the sample size expanding model, the correlation information is a Correlation coefficient; the distance information is an Euclidean distance, a Manhattan distance or a Chebyshev distance; and the distribution similarity information is a k_divergence.

19. The training method for providing the sample size expanding model according to claim 11, wherein in the step of generating the samples via the sample size expanding model, the samples are generated from a preset range in a Gaussian space of the sample size expanding model.

20. The training method for providing the sample size expanding model according to claim 19, wherein in the step of generating the samples via the sample size expanding model, the preset range is from −4 to 4.

* * * * *